(12) United States Patent
Lyu et al.

(10) Patent No.: US 12,190,641 B2
(45) Date of Patent: Jan. 7, 2025

(54) SYSTEM FOR DETECTING FACE LIVELINESS IN AN IMAGE

(71) Applicant: Black Sesame Technologies Inc., San Jose, CA (US)

(72) Inventors: Shuen Lyu, Singapore (SG); Bo Li, Singapore (SG)

(73) Assignee: Black: Sesame Technologies Inc., San Jose, CA (US)

( * ) Notice: Subject to any disclaimer, the term of this patent is extended or adjusted under 35 U.S.C. 154(b) by 612 days.

(21) Appl. No.: 17/474,965

(22) Filed: Sep. 14, 2021

(65) Prior Publication Data

US 2023/0084980 A1 Mar. 16, 2023

(51) Int. Cl.
*G06K 9/00* (2022.01)
*G06F 18/25* (2023.01)
*G06V 10/25* (2022.01)
*G06V 10/26* (2022.01)
*G06V 10/764* (2022.01)
*G06V 10/80* (2022.01)
*G06V 10/82* (2022.01)
*G06V 20/20* (2022.01)
*G06V 40/16* (2022.01)
*G06V 40/40* (2022.01)

(52) U.S. Cl.
CPC ............. *G06V 40/45* (2022.01); *G06F 18/25* (2023.01); *G06V 10/25* (2022.01); *G06V 10/26* (2022.01); *G06V 10/764* (2022.01); *G06V 10/80* (2022.01); *G06V 10/82* (2022.01); *G06V 20/20* (2022.01); *G06V 40/161* (2022.01); *G06V 40/168* (2022.01); *G06V 40/172* (2022.01); *G06V 40/40* (2022.01)

(58) Field of Classification Search
None
See application file for complete search history.

(56) References Cited

U.S. PATENT DOCUMENTS 8,856,541 B1 10/2014 Chaudhury et al.

OTHER PUBLICATIONS

Sun et al., "Face Spoofing Detection Based on Local Ternary Label Supervision in Fully Convolutional Networks," in IEEE Transactions on Information Forensics and Security, vol. 15, pp. 3181-3196, 2020 (Year: 2020).*

* cited by examiner

*Primary Examiner* — Feng Niu
(74) *Attorney, Agent, or Firm* — Timothy T. Wang; Ni, Wang & Massand, PLLC

(57) ABSTRACT

The present invention discloses a liveliness detection technique. The technique is described for identifying facial attributes. The technique identifies the presented face in the image as real or deceptive. The system and method includes identifying the facial attributes and utilizing a multi task learning network. The neural network includes segmentation and classification functionalities. The final output is used to get pixel level semantic information and high level semantic information.

10 Claims, 9 Drawing Sheets

SYSTEM FOR DETECTING FACE LIVELINESS IN AN IMAGE

FIELD OF INVENTION

The present invention generally relates to systems and methods of face liveliness detection, which aims to facilitate the facial attributes to determine whether the presented face, is real or deceptive. More specifically the present invention is directed to propose a novel face anti-spoofing multi-task learning network, which combine the segmentation task with classification task to perform facial image liveliness detection.

BACKGROUND

Image-based face anti-spoofing refers to face anti-spoofing techniques that only take RGB images as input without extra information such as depth or heat. In our previous work as mentioned by "Blacksesame" in "RGB-NIR dual camera face antispoofing system based on deep neural network", we have tried multiple-sensor based method that also can achieve high performance. Existing image-based face anti-spoofing methods can be categorized into two groups: Traditional methods and deep learning-based methods.

Most recently, deep learning methods, especially convolution neural networks, has been exploited in the face anti-spoofing research and several proposed CNN works outperform the traditional methods in general as mentioned by "Yaojie Liu" in "Computer Vision and Pattern Recognition". Moreover, the methods by "Lei Li and Keyurkumar Patel" in "Cross-database face antispoofing with robust feature representation" utilizes a pretrained CaffeNet or VGG-face model as a feature extractor to distinguish live and spoof faces.

In addition, multiple spatial scales have been leveraged in "Self-adaptive matrix completion for heart rate estimation from face videos under realistic conditions" by "Sergey Tulyakov" to classify live and spoof images. Additional information, such as remote photo plethysmography and spoof noise, has been exploited.

The method explained in "Learn convolutional neural network for face anti-spoofing" by "J Yang" propose to use a stack of images with different scales cropped from the original frame as the input of a CNN model. Also, the method mentioned in "Learning temporal features using lstmcnn architecture for face anti-spoofing" by "Z. Xu" proposes to leverage the temporal features between frames via a LSTM CNN networks and "Y. Atoum" in "Face anti-spoofing using patch and depth-based cnns" proposes to use a Fully Convolutional Neural Network to estimate the depth of the input face, the generated depth map is then fed into an SVM to distinguish between live and spoofed faces.

Another prior art a U.S. Pat. No. 8,856,541 provides a technique to detect liveliness in an image by utilizing a graphical user interface. The system in the invention utilizes the GUI an element to provide a challenge pattern for detecting the eye movement of the person based on the first and second images of the face. Although the prior art provides a thorough analysis and provide accurate results, but still fails to detect the liveliness in case only single image is provided.

Despite the progress in their performance with regard to traditional methods, the detection accuracy and the robustness to the nuisance variables in the wild are still less satisfied for practical use. Also, all the referred references address the problem of liveliness detection they are having limitations as none of the references disclose segmented guided classification anti spoofing network.

Therefore to overcome the limitations of the above mentioned references we propose a novel face anti-spoofing multi-task learning network, which combine the segmentation task with classification task. Moreover, a system which includes following innovations over the prior arts:

A new multi-task learning network for face anti-spoofing.
A multi-scale attention input solution for face anti-spoofing task.
A decision fusion scheme of main task and side task.

The present invention seeks to provide an improvement on identifying liveliness in an image. The invention provides a multi-task learning network, named segmentation guided classification face anti-spoofing network.

It is apparent now that numerous methods and systems are developed in the prior art that are adequate for various purposes. Furthermore, even though these inventions may be suitable for the specific purposes to which they address, accordingly, they would not be suitable for the purposes of the present invention as heretofore described. Thus, there is a need for an advanced image detection system that detects the liveliness in the image.

SUMMARY

The present invention provides a system and a method for liveness detection of a facial image utilizing facial attributes to determine whether the presented face is real or fake. The invention proposes a novel face anti spoofing multitask learning network. Moreover, the learning network combines the segmentation task with classification task to perform facial image liveliness detection. Also, the system includes multiple primary elements as mentioned to achieve the target of detecting whether the input image is real or fake.

A face detection module for processing and scaling input images to generate feature maps for the input images scaling is usually done to extract more or less facial attributes depending upon the requirements A Segmentation guided classification anti-spoofing network which performs segmentation and classification of the images.

A fusion module which combines the results of segmentation and classification module to identify liveliness on a facial image The primary objective of the invention is to provide a multi-task learning network utilizing segmentation module along with a classification module. The system performs facial image liveliness detection.

Input images are presented to a face detection module for processing and identifying the region of interest (ROI). The face detection module identifies the face and highlights the face by a bounding box. The identified face is scaled to rescale the image to identify detailed facial attributes. Also, the information outside the face area and face part is obtained.

The segmentation module extracts pixel level semantic information. Annotation is performed in order to get accurate semantic information for each pixel. The live and spoofed images are annotated with four labels at the pixel levels these annotations are colored representation of images at the pixel level which identifies certain attributes of images at the pixel level. The segmentation module after segmenting each pixel counts the number of spoofed and live pixels The classification module extracts high level feature information from the input image. A probabilistic determination is performed to detect whether the features belong to spoof or live. Moreover, the probabilistic estimation is achieved via a soft-max function.

Other objective of the present invention is to provide a segmentation module which is used as an auxiliary module to collect the final result.

Another objective of the present invention is to provide a classification module and a fusion module. The classification module determines a probability value and the fusion module fuses the results of the segmentation and the classification module. The classification module and a fusion module are only involved if the segmentation module fails to detect the liveliness in the image.

Yet another objective of the present invention is to provide an annotation unit to annotate individual color to the face, foreground region and background region from a defined color palate.

Another objective of the present invention is to provide annotations on the basis of real face, fake face, real foreground, fake foreground, real background and fake background.

Moreover the annotation unit produces a feature map of the images.

Yet, another objective of the present invention is to provide a decode head to get feature representation which carries local and global context information.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF FIGURES

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF FIGURES

Face liveness detection is an important task in computer vision, which aims to facilitate the facial interaction system to determine whether the presented face is real or deceptive. With the successful deployment of phone unlocking, access control and electronic wallet payment, facial interaction systems have become an indispensable part of the real world. However, these facial interaction systems pose a major threat. Imagine a situation where an attacker owns your photos or videos, can unlock your phone, and can even use an electronic wallet to pay. For this reason, face liveness detection has become an important technology to protect our privacy and property from illegal use by others.

Generally, the sources of illegal attacks mainly consist of printing photograph, screen images or videos, ultra-realistic face masks or a 3-D model of an authorized client. Among these types of attacks, the most flexible attack is print photos or screen images captured from the Internet.

Figure 1A:
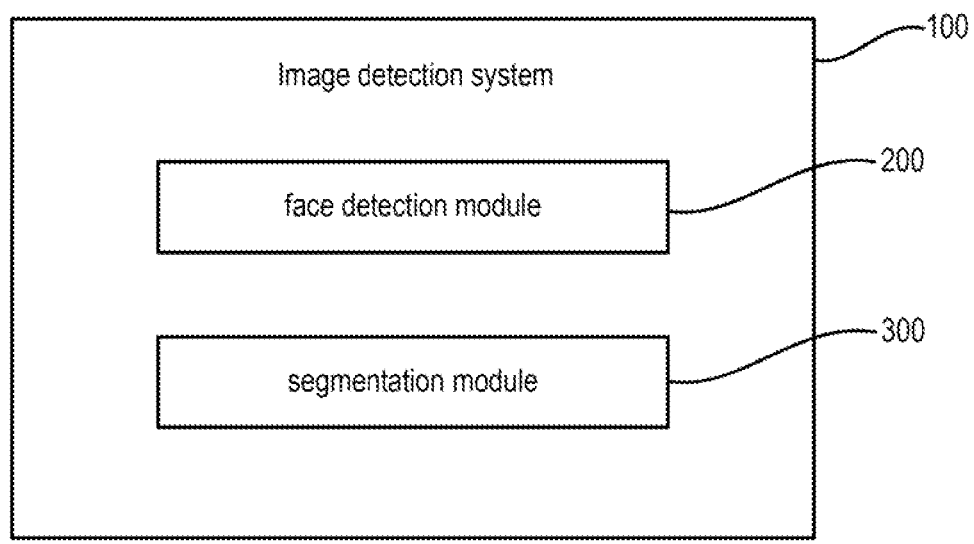
FIG. 1A illustrates an image detection system in first case scenario in accordance with the present invention.

FIG. 1A illustrates an image detection system for detecting liveliness in an image in first case scenario in accordance with the present invention. The image detection system 100 includes a face detection module 200 and a segmentation module 300. The face detection module 200 comprises a processing unit, a scaling unit and an annotation unit.

The processing unit is configures to process the image for identifying a region of interest. The scaling unit performs scaling of the region of interest in the image to identify one or more facial features and generate a first image.

The annotation unit is configured to annotate an individual color from a number of defined colors. A first color is annotated to a face in the image, a second color to a foreground region and a third color to a background region of the first image to generate a second image. The annotation unit allocates the color on the basis of liveness of the foreground region and the background region.

The segmentation module 300 for extracting pixel-level semantic information on the first image and generating a second image, where the segmentation unit is configured to count the number of live and spoofed pixels from the first image. In case the segmentation module fails to detect the liveliness of the video a classification module is used.

Moreover, the face detection module (200) does face detection and generate a bounding box. The segmentation module (300) extracts feature representations from the image. The feature representation carries local and global context information. Also, the per pixel-prediction is obtained from the last convolution layer in the segmentation head.

The segmentation guided classification face anti-spoofing network. The backbone, which is cascaded convolution layer with pooling layer and activation layer, to get the features of each block. Then the decode head (also called segmentation head) is applied to get the final feature representation, which carries local and global context information. Finally, the final per-pixel prediction is obtained from the last convolution layer in the decode head. And the feature map is also fed into the classification head, which consists of one convolution layer and fully connected layer, to get the final feature representation, and get the final probability for spoof/live with a soft-max function.

Figure 1B:
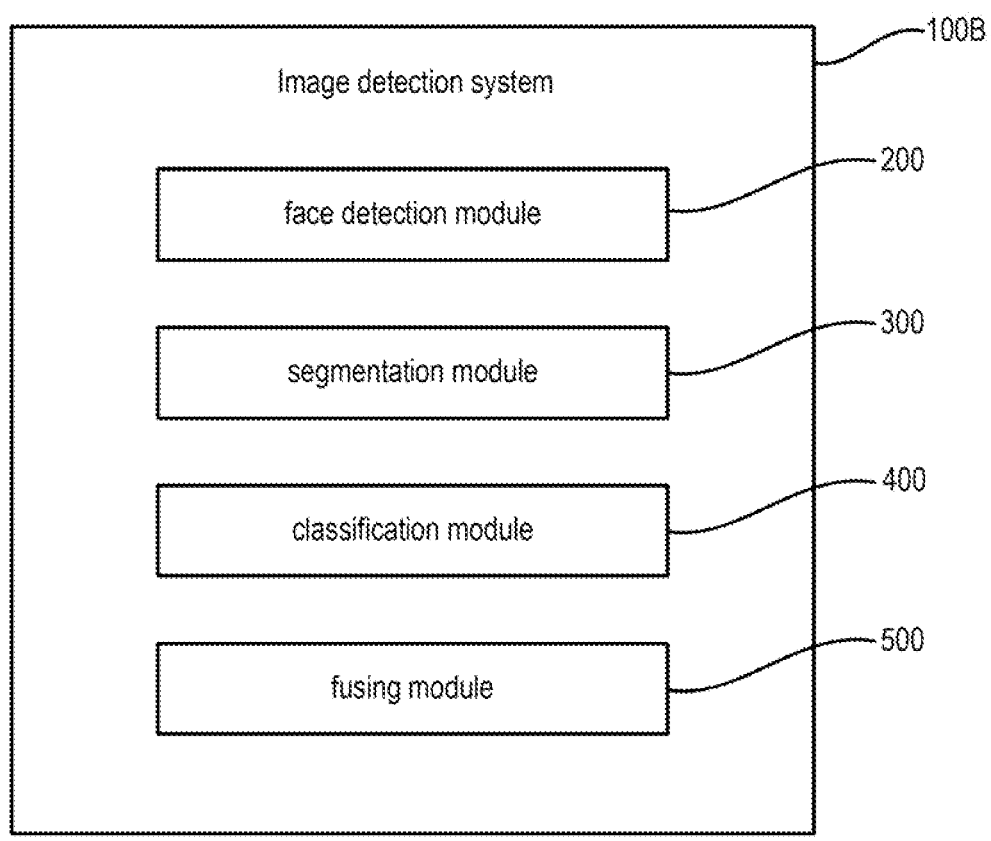
FIG. 1B illustrates the image detection system in second case scenario in accordance with the present invention.

FIG. 1B illustrates an image detection system for detecting liveliness in an image in first case scenario in accordance with the present invention. The segmentation guided classification image detection system (100b) includes a face detection module (200), segmentation module (300), classification module (400) and a fusing module (500). The face detection module (200) does face detection and generate a bounding box.

The segmentation module (300) extracts feature representations from the image which carries local and global context information. Also, per pixel prediction is obtained from the last convolution layer in the segmentation head. The classification module (400) is a layered architecture having one convolution layer and fully connected layer. The feature map is fed into the classification module (400) to get the final feature representation and to get the final probability of spoof/live with a soft-max function. The fusion module (500) verifies the probability of live/spoof and the probability of live/spoof is used for second verification.

The classification unit for extracting high-level feature information on the second image and generating a third image, where the classification unit is configured to estimate a probability whether the features belong to live or spoofed. The fusion unit configured to fuse the second image with the third image for detecting liveliness of the image.

In recent decades, research on attribute-based representations based on objects, faces, and scenes has attracted widespread attention as a supplement to classification representations. However, few works try to use semantic information in face anti-spoofing. In fact, for face anti-spoofing, additional semantic information can be used to characterize the target image through attributes instead of distinguishing it into a single category, that is, live or spoof. In this present article, we design a multi-task learning network, named segmentation guided classification face anti-spoofing network as shown in FIG. 1.

The backbone is amalgamation of cascaded convolution layer with pooling layer and activation layer wherein a segmentation head also called a decode head is present to decode block by block facial feature representations and finally the final feature representation containing per pixel prediction is obtained from last convolution layer in the segmentation or decode head.

The obtained feature map can also be further analyzed, depending upon the requirements, by a classification head which is in the form of layered architecture containing as discussed one convolution layer and fully connected layer to get a much detailed probabilistic estimation of images wherein a soft-max function is used to get final probability for spoofed and live pixels.

The segmentation network, in order to get accurate semantic information for each pixel, annotates the live and spoof images with four labels at pixel level. The yellow color denotes fake face, green color denotes fake foreground and blue color denotes fake background. And the red color denotes real face, purple color denotes real foreground and black color denote real background.

In order to pay more attention on the face area, the input image is more processed with a general face detection model to get the face bounding box, and rescale it to a larger one to get more features. The edge information is contained in the rescaled bounding box.

The network output two results while doing inference, one is output of segmentation task, which segment each pixel of an input image into 1) real face/foreground pixel, 2) fake face/foreground pixel, 3) real background pixel and 4) fake background pixel. The number of real-face pixel and fake face pixel will be counted and used to calculate the probability for real face. The other result, live/spoof probability, is output of classification task. The formula (1) is applied to get the final prediction result.

$$P_l = \alpha \Sigma P_{s1}/(\Sigma P_{s1} + \Sigma P_{ss}) + \beta_{c1}$$

In the formula one: $P_l$ denotes the probability of final result belonging to "live" class, $\Sigma P_{s1}$ and $\Sigma P_{ss}$ denote the total number of real-face and fake face pixels respectively in the output segmentation map. $P_{c1}$ denotes the probability of "live" class from classification head. $\alpha$ and $\beta$ denote the weights for segmentation results and classification results respectively. (default $\alpha = \beta = 0.5$)

The probability of live or spoof from segmentation network is verified firstly and if it meets the condition, then output the final result, otherwise, the probability of live or spoof is used for second verification. The fusion module fuses the output from the segmentation module and the classification module to detect the liveliness of the image.

Figure 2:
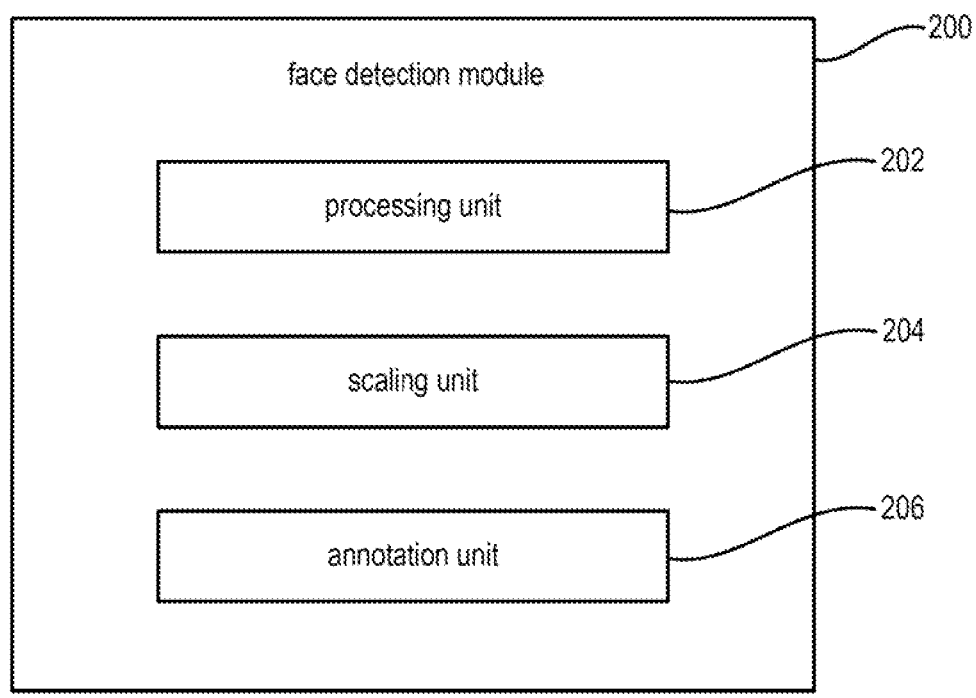
FIG. 2 illustrates a face detection module of the image detection system in accordance with the present invention.

FIG. 2 illustrates a face detection module of the image detection system in accordance with the present invention. The rescaled bounding box is obtained from a general face detection module 200. Moreover, the information outside the face area and the face part is obtained.

The face detection module includes a processing unit 202, a scaling unit 204 and an annotating unit 206. The processing unit 202 processes the input images. The processing is done in order to generate a bounding box and once bounding box is generated. The scaling unit performs the Attention scaling 204 to rescale the image to larger one to get more features.

In order to get accurate semantic information for each pixel an annotation unit (206) is utilized in the system. The annotation unit annotates the face, the foreground region and the background region individually with different colors.

A first color is annotated to a face in the image, a second color to a foreground region and a third color to a background region of the first image to generate a second image. The annotation unit allocates the color on the basis of liveness of the foreground region and the background region.

In order to get accurate semantic information for each pixel, annotates the live and spoof images with four labels at pixel level. The yellow color denotes fake face, green color denotes fake foreground and blue color denotes fake background. In addition, the red color denotes real face; purple color denotes real foreground and black color denote real background.

Figure 3:
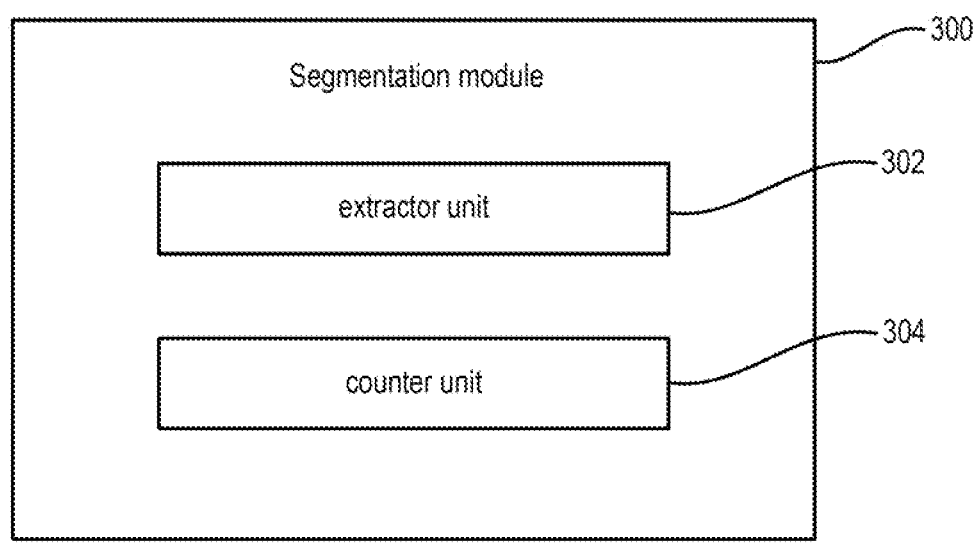
FIG. 3 illustrates a segmentation module of the image detection system in accordance with the present invention.

FIG. 3 illustrates internal components of segmentation module 300. The segmentation module segments each pixel of an input image into 1) real face/foreground pixel, 2) fake face or foreground pixel, 3) real background pixel and 4) fake background pixel.

The segmentation module includes an extractor unit 302 and a counter unit 304. The extractor unit 302 extracts features from each block of the feature map. The pixel level semantic information is extracted by the segmentation module 300. The counter unit 304 counts the number of spoof and live pixels respectively to predict the recognition result to detect the liveliness of the image.

Figure 4:
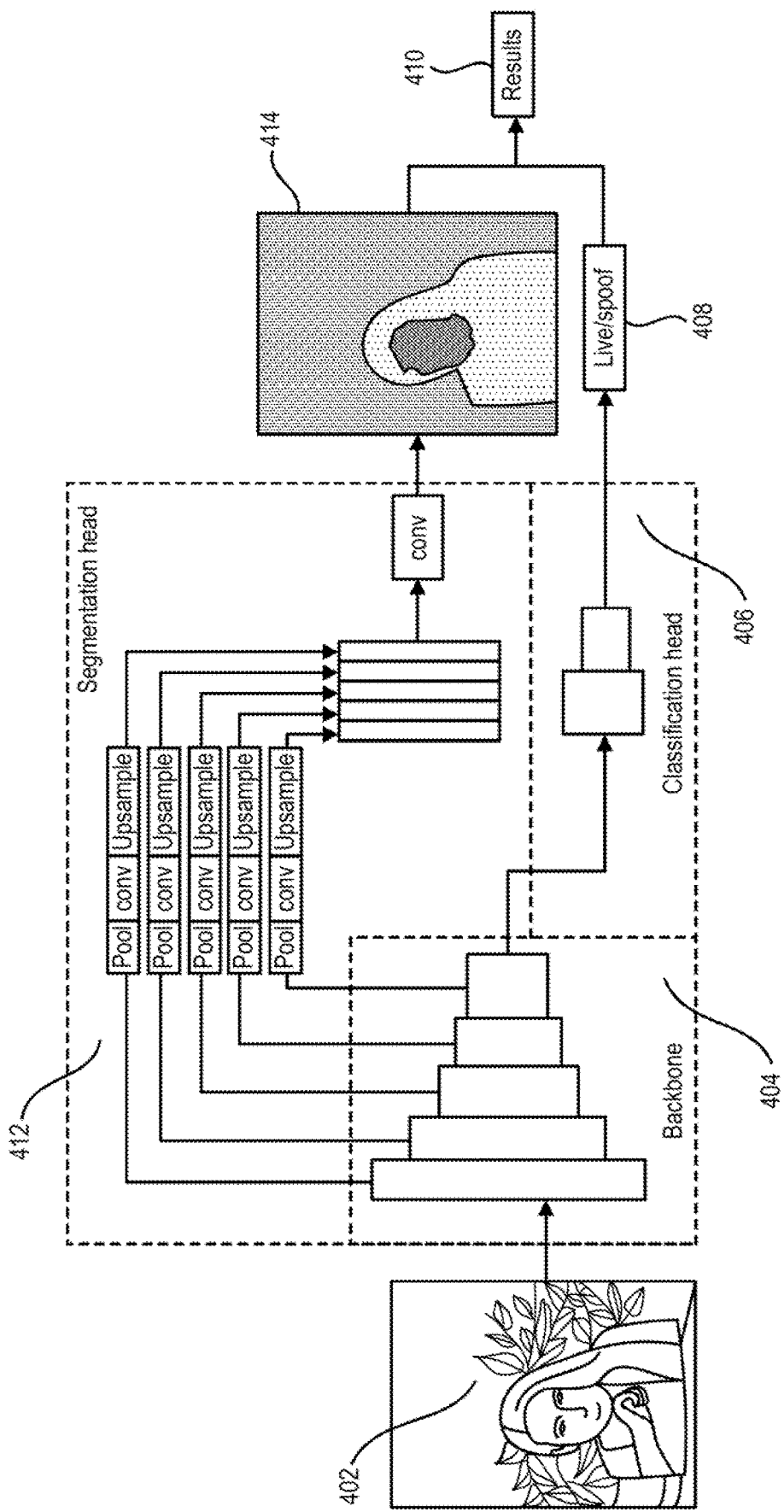
FIG. 4 illustrates a overview of segmentation guided classification face anti-spoofing network in accordance with the present invention.

FIG. 4 illustrates an overview of segmentation guided classification face anti-spoofing network in accordance with the present invention. An input image (402) is presented to the network. The network includes a backbone (404) which is cascaded convolution layer with pooling layer (412) and activation layer. The backbone (which is cascaded convolution layer with pooling layer and activation layer) is used to get the features of each block. Then decode head (also called segmentation head) is applied to get the final feature representation, which carries local and global context information.

Feature from each block is applied to get final feature representation. Per-pixel prediction is obtained from the last convolution layer in the segmentation or the decode head. The feature map thus obtained is fed into the classification head (406) which consists of one convolution layer and fully connected layer to get the final feature representation and get the probability for spoof/live with a soft max function.

Figure 5:
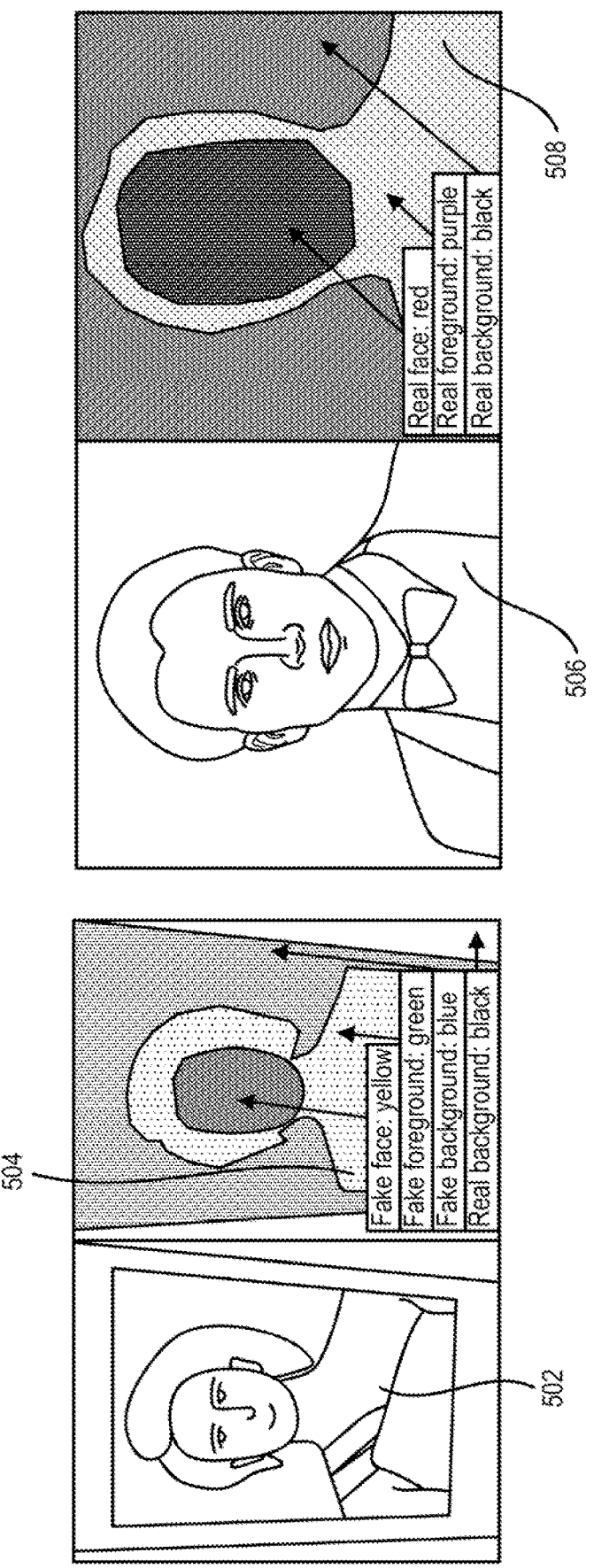
FIG. 5 illustrates annotating the live and spoof images with four labels at pixel level in accordance with the present invention.

FIG. 5 illustrates annotating the live and spoof images with four labels at pixel level in accordance with the invention. The segmentation module, in order to get accurate semantic information for each pixel, we annotate the live and spoof images with four labels at pixel level.

In the figure left ground truth image (502) and left feature map (504) yellow color denotes fake face, green color denotes fake foreground and blue color denotes fake background. In the right ground truth image (506), and right feature map (508) red color denotes real face, purple color denotes real foreground and black color denote real background.

Figure 6:
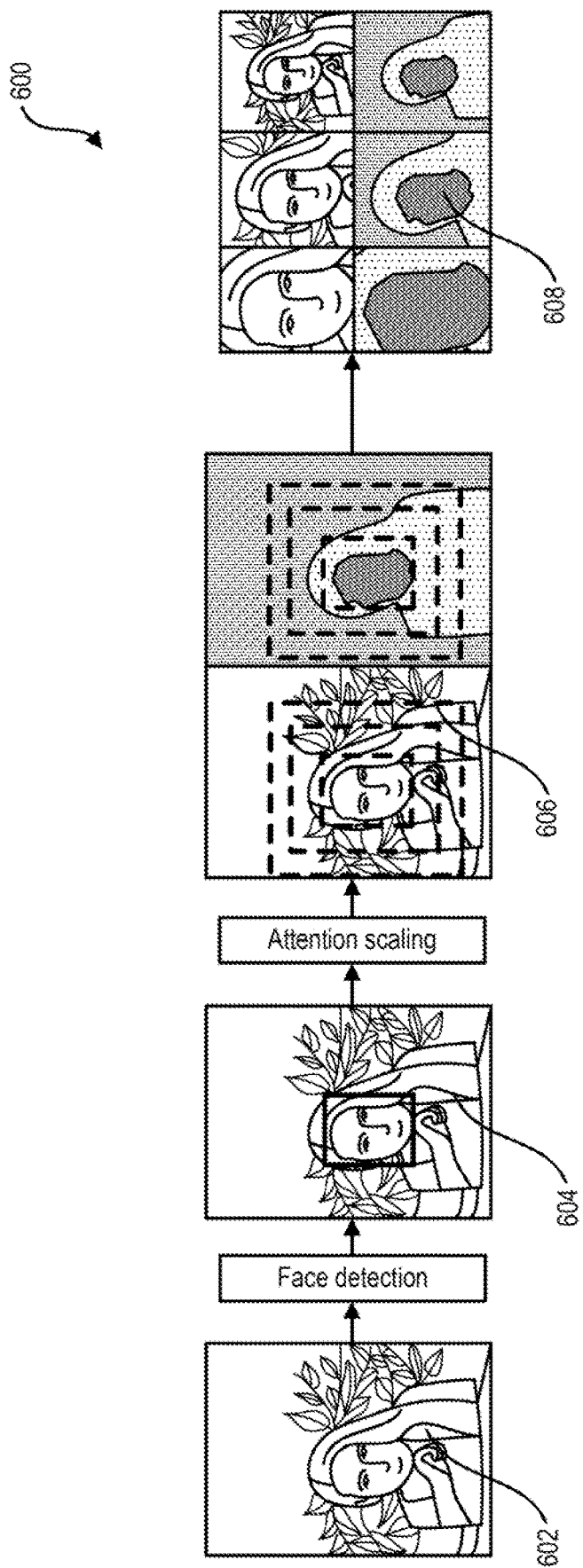
FIG. 6 illustrates a data pre-processing for multi-scale generation in accordance with the present invention.

FIG. 6 illustrates a data pre-processing for multi-scale generation in accordance with the invention. In order to pay more attention on the face area, the input image is processed with a general face detection model to get the face bounding box. The edge information is contained in the rescaled bounding box.

The input image (602) is presented to face detection module (600) to get the face bounding box (604) attention scaling (606) is performed to rescale it to a larger one or smaller one (608) to get more features.

Figure 7:
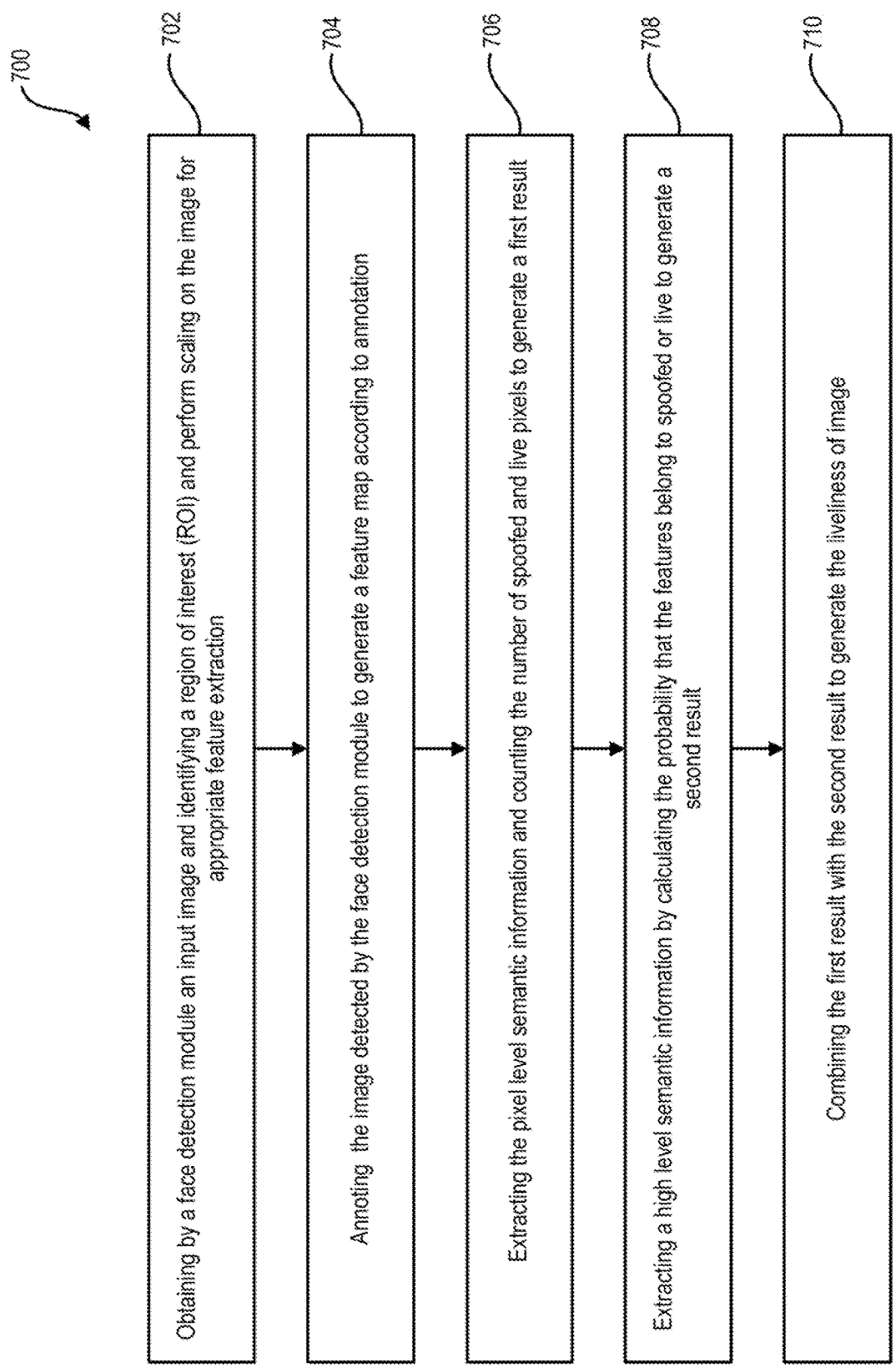
FIG. 7 illustrates a method of detecting liveliness in the image in accordance with the present invention.

FIG. 7 illustrates a method of detecting liveliness in the image in accordance with the invention. At step (702), input image is presented to face detection module the face detection module identifies region of interest by creating a bounding box around the image and scaling unit rescales the image to get larger and more features At step (704), the image detected by the face detection module is annotated to generate feature map the feature map is generated according to the annotation where yellow color denotes fake face, green color denotes fake foreground and blue color denotes fake background, red color denotes real face, purple color denotes real foreground and black color denote real background Next, at step (706) the segmentation module extracts pixel level semantic information from the feature map. The extraction of pixels from the feature map is performed by extractor unit and the counter unit counts the number of spoofed and live pixel to generate the first result. In this case the classification module is not utilized.

If it is required to extract high level semantic information the classification module comes into picture. Further, at step (708) probability that the features belong to spoofed or live is calculated to generate a second result.

Finally, at step (710) fusing module combines the first result with the second result to detect the liveliness of the image.

Figure 8:
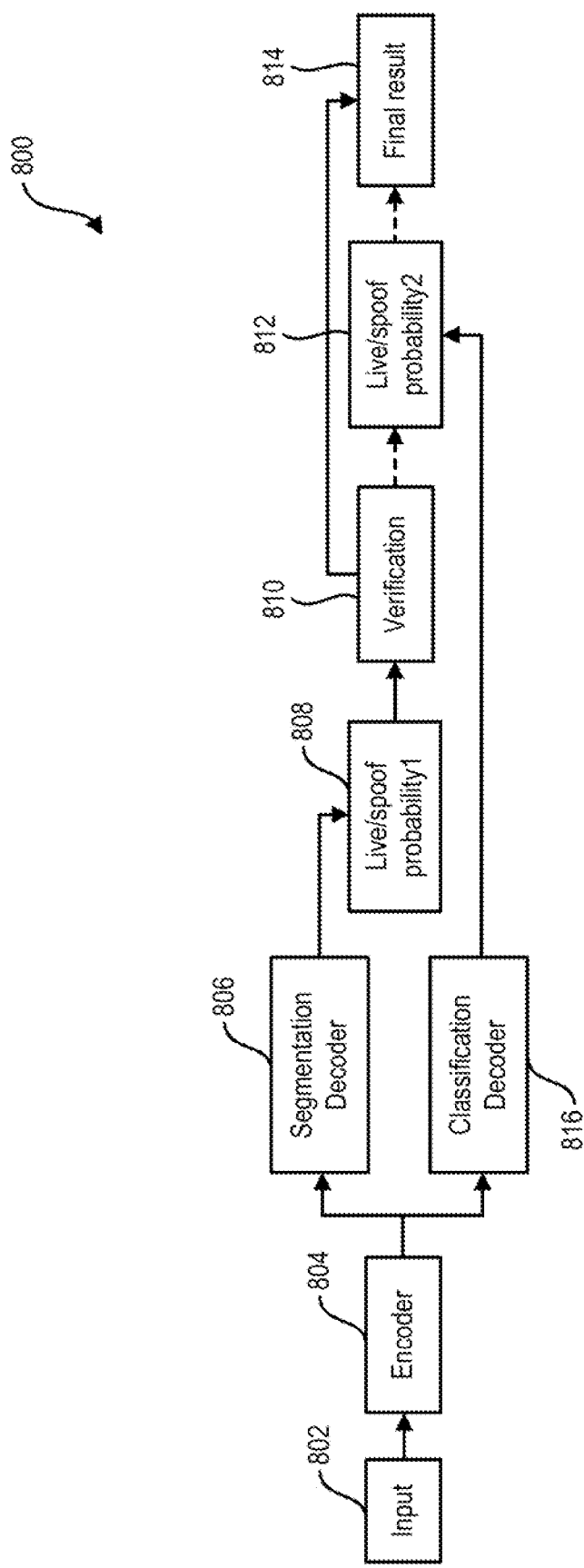
FIG. 8 illustrates a cascaded result fusion flow chart in accordance with the present invention.

FIG. 8 illustrates a cascaded result fusion flow chart in accordance with the invention. Input image (802) is encoded by encoder (804). Then, presented to a segmentation decoder (806) and a classification decoder (816). Live or spoof probability 1 (808) is calculated and first stage verification (810) is performed if the result is satisfactory. Later, this output becomes the final result otherwise classification decoder (816) calculates live or spoof probability 2 (812). The results achieved from segmentation task are combined with classification task to get the final result (814).

In some embodiments only segmentation level information is required and in some embodiment's results of segmentation module is used as an auxiliary to collect the final results.

While the various embodiments of the present invention have been described above, it should be understood that they have been presented by way of example only, and not of limitation. Likewise, the figure may depict an example architectural or other configuration for the invention, which is done to aid in understanding the features and functionality that can be included in the invention. The invention is not restricted to the illustrated example architectures or configurations, but the desired features can be implemented using a variety of alternative architecture and configurations.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

The invention claimed is:

1. A method for detecting face liveness on an input image utilizing multitask learning by performing steps of:
   receiving an image;
   processing the image to identify a region of interest;
   scaling the region of interest to identify one or more facial features to generate a first image;
   annotating a plurality of annotations to the first image to generate a second image;
   wherein annotating the plurality of annotations to the first image comprising allocating a first color from a plurality of defined colors to a face, a second color from the plurality of defined colors to a foreground region and a third color from the plurality of defined colors to a background region of the first image;

extracting a number of pixels within the second image based on the plurality of defined colors to generate a third image; and counting a number of live pixels and a number of spoofed pixels in the third image to detect liveliness in the image.

2. The method of claim 1, further comprising extracting high level feature information from the first image to generate a feature map to determine a probability of the features being live or spoofed.

3. The method of claim 1, wherein the plurality of annotations are on the basis of real face, fake face, real foreground, fake foreground, real background, and fake background.

4. The method of claim 1, further comprising producing a feature map of the first image.

5. The method of claim 2, wherein the extracting high level feature information uses a backbone network.

6. The method of claim 5, wherein the backbone network uses a cascaded convolution layer with pooling layer and activation layer.

7. The method of claim 5, wherein the backbone network uses block architecture.

8. The method of claim 6, wherein the convolution layer and activation layer identifies features of each block.

9. The method of claim 1, wherein the extracting a number of pixels includes a decode head getting a feature representation which carries local and global context information.

10. An image detection system for detecting liveliness in an image comprising a processor to perform the steps of:
receiving an image;
processes the image to identify a region of interest;
scaling the region of interest to identify one or more facial features to generate a first image;
annotating a first color from a plurality of defined colors to a face, a second color from a plurality of defined colors to a foreground region and a third color from the plurality of defined colors to a background region of the first image to generate a second image; and
extracting a number of pixels within the second image based on the plurality of defined colors to generate a third image; and
counting live pixels and spoofed pixels in the third image to detect liveliness in the image.

* * * * *